US011659367B2

(12) United States Patent
Matsunaga et al.

(10) Patent No.: US 11,659,367 B2
(45) Date of Patent: May 23, 2023

(54) SENSOR SYSTEM, WIRELESS COOPERATIVE RECEIVING SYSTEM, AND WIRELESS COOPERATIVE RECEIVING METHOD

(71) Applicant: Nippon Telegraph and Telephone Corporation, Tokyo (JP)

(72) Inventors: Kenichi Matsunaga, Tokyo (JP); Takayuki Ogasawara, Tokyo (JP); Hiroyoshi Togo, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/625,166

(22) PCT Filed: Jul. 8, 2019

(86) PCT No.: PCT/JP2019/026971
§ 371 (c)(1),
(2) Date: Jan. 6, 2022

(87) PCT Pub. No.: WO2021/005678
PCT Pub. Date: Jan. 14, 2021

(65) Prior Publication Data
US 2022/0272505 A1 Aug. 25, 2022

(51) Int. Cl.
*H04W 4/38* (2018.01)
*H04W 4/80* (2018.01)
(Continued)

(52) U.S. Cl.
CPC .............. *H04W 4/38* (2018.02); *H04W 4/80* (2018.02); *H04W 40/12* (2013.01); *H04W 84/18* (2013.01); *H04W 88/04* (2013.01)

(58) Field of Classification Search
CPC ............................. H04W 4/80; H04W 40/12
See application file for complete search history.

(56) References Cited

U.S. PATENT DOCUMENTS

| 10,194,276 B1* | 1/2019 | Singamsetty | ......... H04L 67/566 |
| 2017/0124836 A1* | 5/2017 | Chung | ............... G08B 21/0415 |

(Continued)

OTHER PUBLICATIONS

Ogasawara, Takayuki Application for Rehabilitation Medicine UsingWearable Textile "hitoe" NTT Technical Review, vol. 16, No. 9, Sep. 2018, pp. 6-12.

(Continued)

*Primary Examiner* — David Bilodeau
(74) *Attorney, Agent, or Firm* — Slater Matsil, LLP

(57) ABSTRACT

Relay terminals each transmit to a control device a packet received from a wireless sensor and a reception strength for short range wireless communication detected when receiving the packet, and return a response to the packet to a transmission source wireless sensor from which the packet is transmitted only when a response instruction is issued from the control device, and the control device compares reception strengths for a same packet that is transmitted from a same wireless sensor and received by each of the plurality of relay terminals among the reception strengths received from the relay terminals, transmits the response instruction only to one target relay terminal with the highest reception strength, and performs relay transfer of sensor data stored in a packet received by the target relay terminal to a host apparatus.

9 Claims, 8 Drawing Sheets

(51) Int. Cl.
*H04W 40/12* (2009.01)
*H04W 84/18* (2009.01)
*H04W 88/04* (2009.01)

(56) References Cited

U.S. PATENT DOCUMENTS

2017/0270481 A1* 9/2017 Morgenthau ............ H04W 4/80
2019/0206233 A1* 7/2019 Huseth .................... H04W 4/90

OTHER PUBLICATIONS

Woolley, Martin, "Bluetooth Core Specification v5.1, Feature Overview" Literature, Version: 1.0, Jan. 2019, 12 pages.

* cited by examiner

SENSOR SYSTEM, WIRELESS COOPERATIVE RECEIVING SYSTEM, AND WIRELESS COOPERATIVE RECEIVING METHOD

CROSS-REFERENCE TO RELATED APPLICATIONS

This application is a national phase entry of PCT Application No. PCT/JP2019/026971, filed on Jul. 8, 2019, which application is hereby incorporated herein by reference.

TECHNICAL FIELD

The present invention relates to a wireless coordinated reception technique in which, in a sensor system accommodating a variety and large number of wireless sensors, a plurality of relay terminals coordinately receive a packet transmitted from these wireless sensors.

BACKGROUND

In an IoT (Internet of Things) society in which all things are connected to the Internet, it is expected that a sensor system (multi-sensor system) in which various wireless sensors are accommodated in a network is used to collect a variety and large amount of sensor data acquired by these wireless sensors in a host apparatus such as a server, and analyze these sensor data, thereby extracting useful information. FIG. 9 is a configuration diagram showing a general sensor system. FIG. 9 shows an example configuration of a general sensor system in which a variety and large number of wireless sensors are connected to a gateway via a wireless communication system, and are connected from the gateway via a communication network to a host apparatus composed of a group of servers.

In order to cause such a variety and large number of wireless sensors to function as a part of the sensor system, it is essential for the wireless communication system to correctly receive packets from the wireless sensors storing sensor data. On the other hand, in many wireless sensors, short range wireless communication schemes focusing on low power have been used to realize battery operation for a long time (see, e.g., Non-Patent Literature 1). Therefore, the output powers of the above short range wireless communication schemes are lower than those of wireless communication schemes such as 3G (3rd Generation: 3rd generation mobile communication system)/LTE (long term evolution) and Wi-Fi.

The short wireless communication distance of a wireless sensor due to such low output power can be covered by causing a wireless terminal held by a user wearing the wireless sensor such as a smart phone to function as a relay terminal to receive sensor data from the wireless sensor and perform the relay transfer of it to the side of the host apparatus. By measuring biometric data for 24 hours using these wireless sensors with low output power, application to physical condition management and medical treatment is also expected (see, e.g., Non-Patent Literature 2).

CITATION LIST

Non-Patent Literature

Non-Patent Literature 1: "Bluetooth Core Specification v5.1", Bluetooth, the Internet: https://3pl46c46ctx02p7rzdsvsg21-wpengine.netdna-ssl.com/wp-content/uploads/2019/03/1901_Feature_Overview_Brief_FINAL.pdf, 28 Jan. 2019;

Non-Patent Literature 2: T. Ogasawara, et al., "Application for Rehabilitation Medicine Using Wearable Textile "hitoe"", NTT Technical review, vol. 16, No. 9, pp. 6-12, September 2018.

SUMMARY

Technical Problem

In such a sensor system as shown in FIG. 9, when a packet storing sensor data is transmitted from a wireless sensor and received by a plurality of relay terminals in the wireless communication system, if responses to the transmitted packet are returned from the plurality of relay terminals, the wireless communication may be disconnected on the side of the wireless sensor. Accordingly, in order to receive and collect sensor data without interruption, it is necessary to consider handover in which the relay terminals coordinately hand over a wireless sensor.

On the other hand, since short range wireless communication schemes fundamentally aim to realize one-to-one communication simply with low power, they are not provided with a handover function among the relay terminals such as being implemented in 3G/LTE. For this reason, there is a problem that the wireless communication is necessarily disconnected at the time of handover among the relay terminals, and interruption of sensor data may occur in some cases. This does not really matter for sensor data for which low speed sampling at about 1 Hz or lower is sufficient such as a heart rate, but it really matters for sensor data that requires high speed sampling such as acceleration data and electrocardiographic data.

As one solution for this, a method is conceivable in which a wireless sensor is provided with two short range wireless communication modules, and if each is in a connected state to a different relay terminal, either communication connects to a relay terminal in better communication condition. However, since this method depends on the circuit configuration of the wireless sensor, it is not a method applicable to all the wireless sensors. In addition, it is not desirable to mount two short range wireless communication modules on the wireless sensor that requires low cost, because it contradicts the required low cost. Thus, although it is advantageous in terms of versatility and low cost to use a short range wireless communication scheme in a wireless sensor, the above problems arise when considering applications such as coordinated reception assumed in IoT systems.

Embodiments of the present invention are for solving such problems, and an object thereof is to provide a wireless coordinated reception technique enabling a plurality of relay terminals to coordinately receive a packet transmitted using short range wireless communication.

Means for Solving the Problem

In order to achieve such an object, a sensor system according to embodiments of the present invention includes: one or a plurality of wireless sensors that store detected sensor data in a packet, and transmit the packet by short range wireless communication; a plurality of relay terminals that each receive the packet transmitted from the one or the plurality of wireless sensors; and a control device that is connected to the plurality of relay terminals through a communication line, and controls reception operation of the packet in the plurality of relay terminals, wherein the plurality of relay terminals each transmit to the control device the packet received from the one or the plurality of wireless sensors and a reception strength for the short range wireless communication detected when receiving the packet, and return a response to the packet to a transmission source wireless sensor from which the packet is transmitted only when a response instruction is issued from the control device, and the control device compares reception strengths for a same packet that is transmitted from a same wireless sensor and received by each of the plurality of relay terminals among the reception strengths received from the plurality of relay terminals, transmits the response instruction only to one target relay terminal with the highest reception strength, and performs relay transfer of sensor data stored in a packet received by the target relay terminal to a host apparatus.

Further, a wireless coordinated reception system according to embodiments of the present invention includes: a plurality of relay terminals that each receive a packet transmitted from one or a plurality of wireless terminals by short range wireless communication; and a control device that is connected to the plurality of relay terminals through a communication line, and controls reception operation of the packet in the plurality of relay terminals, wherein the plurality of relay terminals each detect a reception strength for the short range wireless communication when receiving the packet, transmit the reception strength to the control device, and return a response to the packet to a transmission source wireless sensor from which the packet is transmitted only when a response instruction is issued from the control device, and the control device compares reception strengths for a same packet that is transmitted from a same wireless terminal and received by each of the plurality of relay terminals among the reception strengths received from the plurality of relay terminals, and transmits the response instruction only to one target relay terminal with the highest reception strength.

Further, a wireless coordinated reception method according to embodiments of the present invention is a wireless coordinated reception method used in a wireless coordinated reception system including a plurality of relay terminals and a control device connected to the plurality of relay terminals through a communication line, the wireless coordinated reception method including: a reception step of the plurality of relay terminals each receiving a packet transmitted from one or a plurality of wireless terminals by short range wireless communication; and a control step of the control device controlling reception operation of the packet in the plurality of relay terminals, wherein the reception step includes a step of detecting a reception strength for the short range wireless communication when receiving of the packet and transmitting the reception strength to the control device, and a step of returning a response to the packet to a transmission source wireless sensor from which the packet is transmitted only when a response instruction is issued from the control device, and the control step includes a step of comparing reception strengths for a same packet that is transmitted from a same wireless terminal and received by each of the plurality of relay terminals among the reception strengths received from the plurality of relay terminals, and transmitting the response instruction only to one target relay terminal with the highest reception strength.

Effects of embodiments of the Invention

According to embodiments of the present invention, it is possible for a plurality of relay terminals to coordinately receive a packet transmitted using short range wireless communication, and when it is applied to the sensor system, it is possible to receive and collect sensor data transmitted in a packet from a wireless sensor without interruption.

DETAILED DESCRIPTION OF ILLUSTRATIVE EMBODIMENTS

Hereinafter, embodiments of the present invention will be described with reference to the drawings.

First Embodiment

Figure 1:
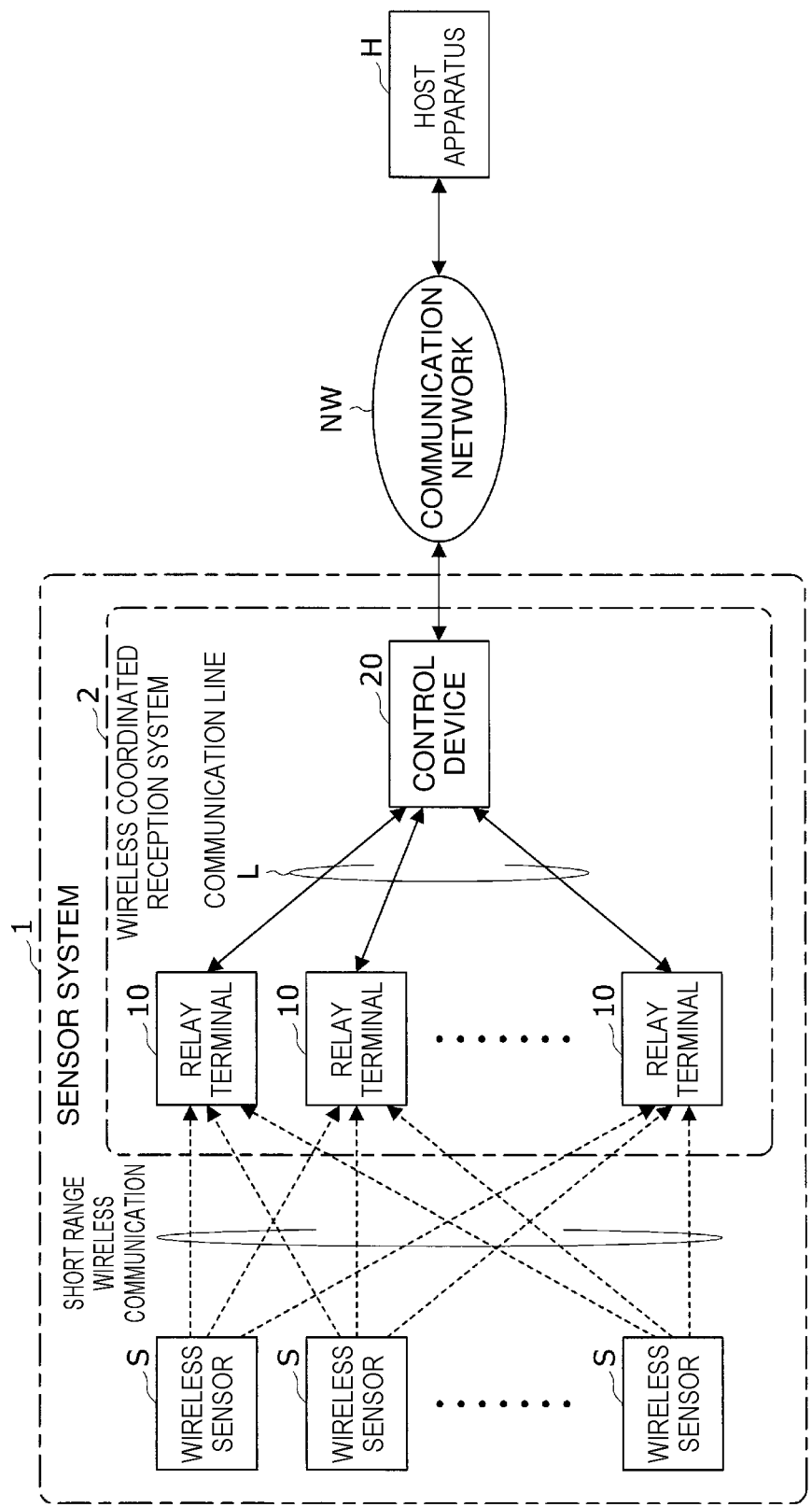
FIG. 1 is a block diagram showing a configuration of a sensor system according to a first embodiment.

First, referring to FIG. 1, a sensor system 1 according to a first embodiment of the present invention will be described. FIG. 1 is a block diagram showing a configuration of a sensor system according to the first embodiment.

Sensor System

As shown in FIG. 1, this sensor system 1 is a system in which sensor data detected by one or a plurality of wireless sensors S is stored in packets and transmitted by short range wireless communication, these packets are received by a plurality of relay terminals 10 and transmitted to one control device 20 through a communication line L, and the relay transfer of the sensor data stored in the received packets is performed from the control device 20 through a communication network NW to a host apparatus H.

Hereinafter, a case will be described by way of example where a wireless sensor S is composed of a wearable sensor worn on a user's human body to detect biometric data, and the sensor system 1 collects the biometric data of the user. Further, in FIG. 1, the relay terminals 10 and the control device 20 constitutes a wireless coordinated reception system 2. The wireless coordinated reception system 2 is a wireless communication system in which the relay terminals 10 coordinately receive a packet from one or a plurality of wireless sensors S, and perform the relay transfer of it to the host apparatus H via the communication network NW.

Principle of Embodiments of the Invention

Then, the principle of embodiments of the present invention will be described. As described above, when a packet storing sensor data is transmitted from a wireless sensor S and received by a plurality of relay terminals 10, if responses to the transmitted packet are returned from the plurality of relay terminals 10, the wireless communication may be disconnected on the side of the wireless sensor S. The point in solving the problem is how to solve such inconvenience that arises when a plurality of relay terminals 10 are present.

As an example, referring to "Low Energy Controller volume" in Non-Patent Literature 1, a step is defined in which when receiving a Link Layer (LL) packet from the transmission side, the reception side returns an LL Ack (response). When this LL Ack is not returned, the wireless connection is disconnected on the transmission side. On the other hand, when a plurality of LL Acks are returned, it is undefined how the transmission side functions as an unexpected operation. If there is no definition, the wireless communication can be disconnected on the transmission side, so a configuration is needed such that in response to one LL packet from the transmission side, the reception sides coordinate with each other to return only one LL Ack from any one reception side.

Embodiments of the present invention are configured such that each of the relay terminals 10 detects a reception strength for short range wireless communication with a wireless sensor S in receiving a packet, the control device 20 compares reception strengths for the same packet that is transmitted from the same wireless sensor S and received by each of the relay terminals 10 among these reception strengths, and transmits a response instruction to the relay terminal 10 with the highest reception strength, and the relay terminal 10 that receives this response instruction returns a response to the received packet to the transmission source wireless sensor S. Thereby, embodiments of the present invention can be configured to return one response to one packet transmitted from the wireless sensor S only from one relay terminal 10 with the highest reception strength. Accordingly, embodiments of the present invention can realize coordinated reception of a packet among the relay terminals 10.

Wireless Sensor

Then, a wireless sensor S used in the sensor system 1 according to this embodiment will be described. The wireless sensor S is a sensor terminal that is composed of an IC chip powered by a battery, stores sensor data detected by a mounted sensor in a packet, and wirelessly transmits it in a short range wireless communication scheme. Specific examples of the wireless sensor S include a wearable sensor that detects biometric data such as electrocardiogram, pulse waves, acceleration, and body temperature. Specific examples of the short range wireless communication scheme used in the wireless sensor S include Bluetooth® and ZigBee®. Note that although it is theoretically sufficient that at least one wireless sensor S is present in the sensor system 1, a case will be described below where a plurality of wireless sensors S are present in accordance with actual applications.

Relay Terminal

Then, the relay terminals 10 used in the sensor system 1 according to this embodiment will be described. The relay terminals 10 are wireless terminals that each receive packets wirelessly transmitted from a plurality of wireless sensors S in the short range wireless communication scheme. Specific examples of a relay terminal 10 include a smart phone held by a user, and an IoT gate installed in a facility. Note that since a relay terminal 10 basically functions to receive sensor data, it may be referred to as a receiver.

Figure 2:
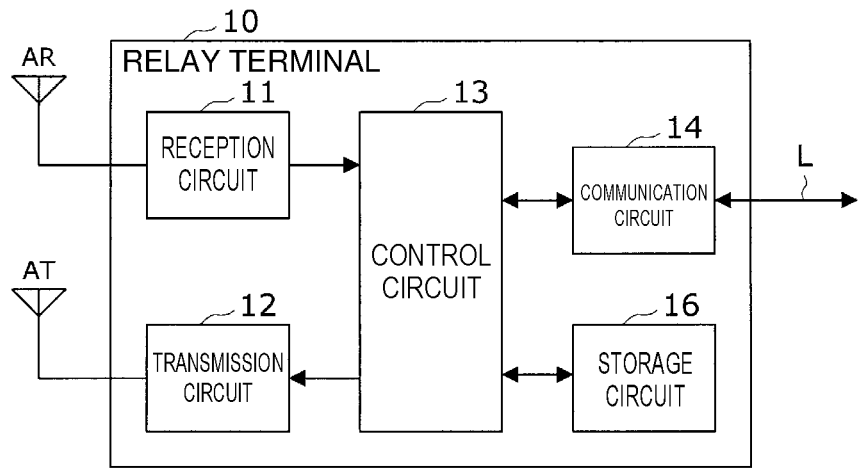
FIG. 2 is a block diagram showing a configuration of a relay terminal.

FIG. 2 is a block diagram showing a configuration of a relay terminal. As shown in FIG. 2, a relay terminal 10 includes, as main circuit units: a reception antenna AR and a transmission antenna AT; a reception circuit 11 for short range wireless communication connected to the reception antenna AR; a transmission circuit 12 for short range wireless communication connected to the transmission antenna AT; a communication circuit 14 that performs data communication with the control device 20 through the communication line L; a control circuit 13; and a storage circuit 16.

The control circuit 13 is composed of an arithmetic processing circuit (MCU: micro controller unit) as a whole. The control circuit 13 cooperates with a program stored in an internal memory or the storage circuit 16 to transmit a packet received by the reception circuit 11 and a reception strength for the packet detected by the reception circuit 11 from the communication circuit 14 to the control device 20 as relay processing operation of a packet. Along with that, the control circuit 13 suspends returning a response to the transmission source wireless sensor S for the packet, thereafter returns a response from the transmission circuit 12 to the transmission source wireless sensor S only when the communication circuit 14 receives a response instruction from the control device 20, and ceases to return a response to the transmission source wireless sensor S when a response instruction from the control device 20 is not received. The storage circuit 16 is composed of a semiconductor memory as a whole, and stores various types of processing data and programs used in the control circuit 13, such as received packets and reception strengths for the packets.

According to the configuration in FIG. 2, it is possible to reduce the cost of a relay terminal 10 because a host controller interface (HCI) generally required is not required. Although FIG. 2 describes a case where the reception antenna AR and the transmission antenna AT are separately provided as antennas for short range wireless communication, an antenna AX for both transmission and reception may be used instead of them.

Figure 3:
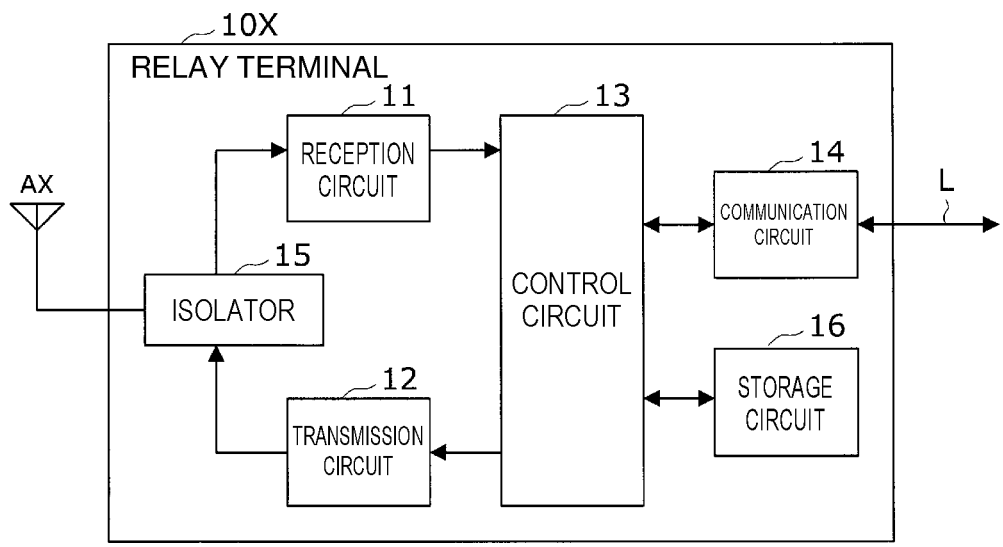
FIG. 3 is a block diagram showing another configuration of a relay terminal.

FIG. 3 is a block diagram showing another configuration of a relay terminal. A relay terminal 10X in FIG. 3 includes an antenna AX for both transmission and reception instead of the reception antenna AR and the transmission antenna AT in FIG. 2. An isolator 15 for blocking wraparound of a signal from the transmission side to the reception side is connected to the antenna AX for both transmission and reception, and each of the reception circuit 11 and the transmission circuit 12 for short range wireless communication is connected to the isolator 15. The control circuit 13 and the communication circuit 14 are the same as those in FIG. 2. Since this configuration enables the relay terminal 10X to be composed of one antenna, it is useful for cost reduction.

Control Device

Then, the control device 20 used in the sensor system 1 according to this embodiment will be described. The control device 20 is a communication control apparatus that is connected to the plurality of relay terminals 10 through the communication line L, and controls reception operation of packets in these relay terminals 10. Specific examples of the control device 20 include a gateway, a hub, a modem, and a server apparatus. Although a case will be described below by way of example where the communication line L is composed of a wired line such as a LAN, it is not limited to this, but may be a wireless line such as a wireless LAN.

Figure 4:
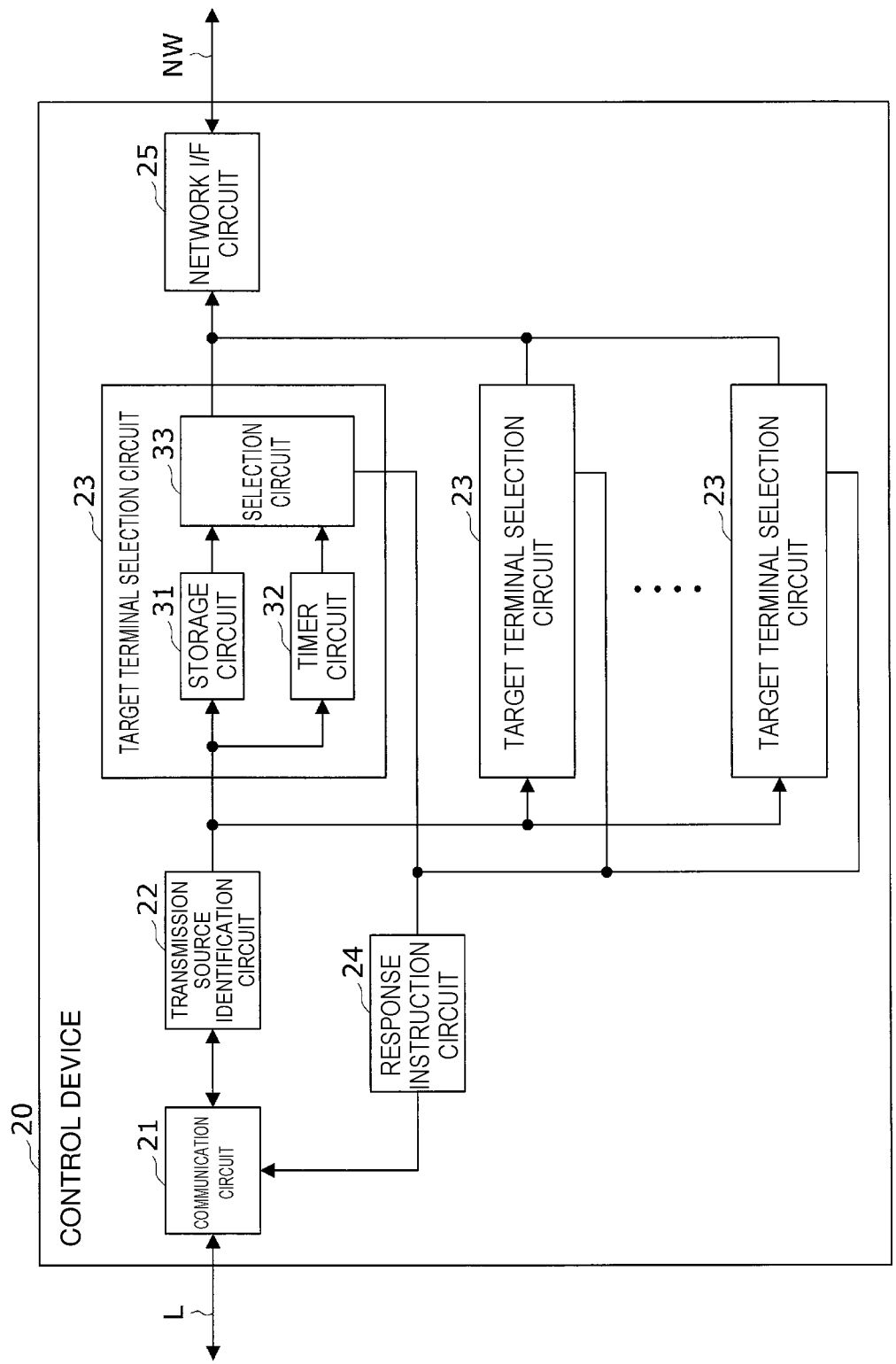
FIG. 4 is a block diagram showing a configuration of a control device according to the first embodiment.

FIG. 4 is a block diagram showing a configuration of the control device according to the first embodiment. As shown in FIG. 4, the control device 20 includes, as main circuit units, a communication circuit 21, a transmission source identification circuit 22, a relay terminal selection circuit 23, a response instruction circuit 24, and a network interface circuit (hereinafter referred to as a network I/F circuit) 25.

The communication circuit 21 performs data communication with the plurality of relay terminals 10 through the communication line L. Based on a packet from a relay terminal 10 received by the communication circuit 21, the transmission source identification circuit 22 extracts an address or identification information of the wireless sensor S from which the packet is transmitted to identify the transmission source wireless sensor S for the packet.

The relay terminal selection circuit 23 compares reception strengths for the same packet that is transmitted from the same wireless sensor S and received by each of a plurality of relay terminals 10 among reception strengths from relay terminals 10 received by the communication circuit 21, and selects the relay terminal 10 with the highest reception strength as the target relay terminal. Details of the configuration of the relay terminal selection circuit 23 will be described later. Note that since the relay terminal selection circuit 23 temporarily stores packets and reception strengths received from each relay terminal 10 as a packet list, it may be referred to as a sensor packet list circuit.

The response instruction circuit 24 generates a response instruction to the target relay terminal selected by the relay terminal selection circuit 23, and transmits it from the communication circuit 21 to the target relay terminal. The network I/F circuit 25 performs the relay transfer of sensor data stored in a packet transmitted from the target relay terminal to the host apparatus H via the communication network (host network) NW such as the Internet. Specific examples of the host apparatus H include a server apparatus and a cloud system that analyze and use sensor data such as biometric data.

Relay Terminal Selection Circuit

Then, referring to FIG. 4 described above, the relay terminal selection circuit 23 used in the control device 20 of the sensor system 1 according to this embodiment will be described in detail. As shown in FIG. 4, the relay terminal selection circuits 23 is connected in plurality to the transmission source identification circuit 22 in parallel. This configuration is for receiving and parallelly processing packets from different wireless sensors S at temporally overlapped timings.

In such a configuration, the transmission source identification circuit 22 outputs a plurality of packets that are transmitted from an identified transmission source wireless sensor S and received by a plurality of respective relay terminals 10 and a plurality of reception strengths for these plurality of respective packets to a relay terminal selection circuit 23 corresponding to the identified transmission source wireless sensor S of the relay terminal selection circuits 23. Further, the relay terminal selection circuit 23 stores the plurality of packets and the plurality of reception strengths output from the transmission source identification circuit 22, compares the plurality of reception strengths, and selects a relay terminal 10 with the highest reception strength of the plurality of relay terminals 10 as the target relay terminal.

Each of the relay terminal selection circuits 23 includes, as main circuit units, a storage circuit 31, a time counting circuit 32, and a selection circuit 33. The storage circuit 31 is composed of a storage such as a semiconductor memory as a whole, and sequentially stores a plurality of packets and a plurality of reception strengths output from the transmission source identification circuit 22 as a packet list.

The time counting circuit 32 is composed of a timer circuit such as a countdown timer that operates with a clock signal as a whole, and counts a waiting period of a certain time length from the reception timing of the packet first received from the transmission source wireless sensor S identified by the transmission source identification circuit 22. In response to the expiration of the waiting period based on the time counting circuit 32, the selection circuit 33 compares a plurality of reception strengths stored in the storage circuit 31 during the waiting period, and selects the relay terminal 10 with the highest reception strength of the plurality of relay terminals 10 as the target relay terminal.

The number of the relay terminal selection circuits 23 provided in the control device 20 corresponds to the number of packets parallelly transmitted from different wireless sensors S, and its maximum value is equal to the total number of the wireless sensors S. However, the number of the relay terminal selection circuits 23 depends on an application to which the sensor system 1 is applied, and when the number of wireless sensors S that transmit packets almost at the same time is smaller than the total number, the number of the relay terminal selection circuits 23 can be reduced to be less than the total number of the wireless sensors S.

Further, since a relay terminal selection circuit 23 can be implemented in a very simple configuration as described above, many relay terminal selection circuits 23 can be mounted on the control device 20. Since this means that a large number of wireless sensors S can be handled by the control device 20, it can be said that it is more suitable for IoT systems than general short range wireless systems in which the number of connections is limited depending on the IC chip used.

Sensor Data Collection Operation

Figure 5:
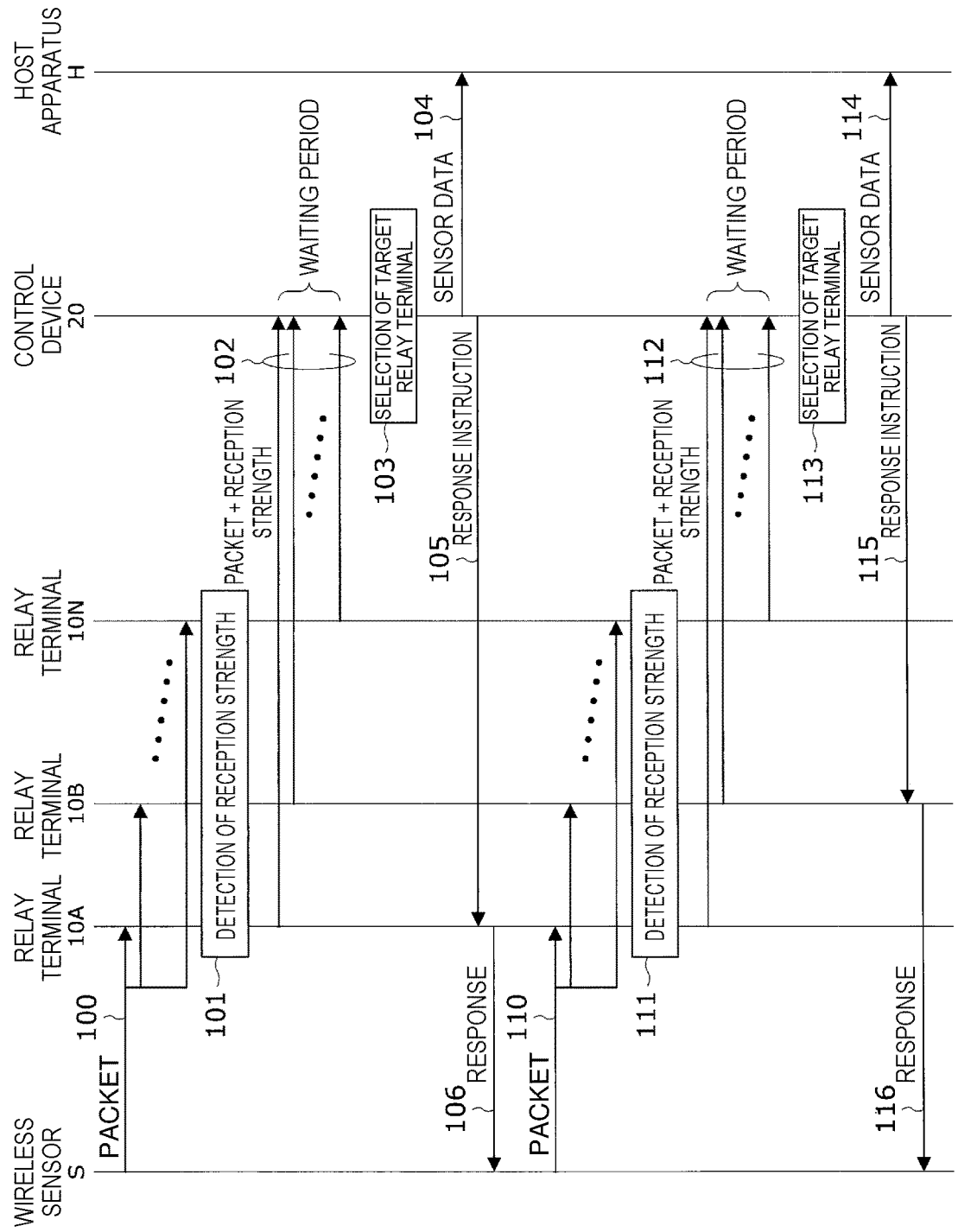
FIG. 5 is a sequence diagram showing a sensor data collection operation in the sensor system.

Then, referring to FIG. 5, a sensor data collection operation in the sensor system 1 according to the wireless coordinated reception method of this embodiment will be described. FIG. 5 is a sequence diagram showing a sensor data collection operation in the sensor system. Although FIG. 5 shows a case where relay terminals 10A, 10B, ..., 10N are installed as the relay terminals 10 of the sensor system 1 and a packet transmitted from one wireless sensor S is received by all of these relay terminals 10A, 10B, ..., 10N, there is no limitation to this.

In actual cases, depending on the positional relationship between the wireless sensor S and each of the relay terminals 10A, 10B, ..., 10N, a packet is received by any one or more of the relay terminals 10A, 10B, ..., 10N that can perform short range wireless communication with the wireless sensor S. The relay terminal 10 with the highest reception strength is selected by the control device 20 from among relay terminals 10 that has received the packet as the target relay terminal.

First, a packet storing sensor data is transmitted from the wireless sensor S by short range wireless communication (step S100), and received by the relay terminals 10A, 10B, ..., 10N. The relay terminals 10A, 10B, ..., 10N each detects a reception strength for short range wireless communication in receiving the packet (step S101), and transmits the packet and the reception strength to the control device 20 (step S102).

The control device 20 receives the packets and the reception strengths from the relay terminals 10A, 10B, ..., 10N, and selects the relay terminal 10 with the highest reception strength, in this example, the relay terminal 10A from among the relay terminals 1A, 10B, ..., 10N as the target relay terminal (step S103). Thereafter, the control device 20 performs the relay transfer of sensor data stored in the packet from the relay terminal 10A which is the target relay terminal to the host apparatus H via the communication network NW (step S104).

Further, the control device 20 generates a response instruction, and transmits it to the relay terminal 10A which is the target relay terminal through the communication line L (step S105). The relay terminal 10A returns a response corresponding to the received packet to the wireless sensor S from which it is transmitted according to the response instruction from the control device 20 (step S106). At this time, since the other relay terminals 10B, . . . , 10N other than the relay terminal 10A are not notified of a response instruction from the control device 20, they do not return a response corresponding to the received packet to the wireless sensor S from which it is transmitted.

Thereby, even when a packet from the wireless sensor S is received by a plurality of relay terminals 10A, 10B, . . . , 10N, a response is returned to the wireless sensor S only from the relay terminal 10A which is the target relay terminal. That is, even when a short range wireless communication scheme is used, coordinated reception of a packet transmitted from the wireless sensor S among the relay terminals 10A, 10B, . . . , 10N is realized.

Thereafter, when a packet storing new sensor data is transmitted from the wireless sensor S by short range wireless communication (step S110), it is received by the relay terminals 10A, 10B, . . . , 10N in the same manner. The relay terminals 10A, 10B, . . . , 10N each detect a reception strength for short range wireless communication in receiving the packet (step S111), and transmit the packet and the reception strength to the control device 20 (step S112).

The control device 20 receives the packets and the reception strengths from the relay terminals 10A, 10B, . . . , 10N, and selects the relay terminal 10 with the highest reception strength, in this example, the relay terminal 10B from among the relay terminals 10A, 10B, . . . , 10Na as the target relay terminal (step S113). Thereafter, the control device 20 performs the relay transfer of sensor data stored in the packet from the relay terminal 10B which is the target relay terminal to the host apparatus H via the communication network NW (step S114).

Further, the control device 20 generates a response instruction, and transmits it to the relay terminal 10B which is the target relay terminal through the communication line L (step S115). The relay terminal 10B returns a response corresponding to the received packet to the wireless sensor S from which it is transmitted according to the response instruction from the control device 20 (step S116). At this time, since the other relay terminals 10A, . . . , 10N other than the relay terminal 10B are not notified of a response instruction from the control device 20, they do not return a response corresponding to the received packet to the wireless sensor S from which it is transmitted.

Thereby, even when a packet from the wireless sensor S is received by a plurality of relay terminals 10A, 10B, . . . , 10N, a response is returned to the wireless sensor S only from the relay terminal 10B which is the target relay terminal. That is, even when a short range wireless communication scheme is used, coordinated reception of a packet transmitted from the wireless sensor S among the relay terminals 10A, 10B, . . . , 10N is realized.

Such an operation makes it possible to avoid disconnection of wireless communication on the side of the wireless sensor S that may occur when a plurality of responses are returned to the wireless sensor S, and as a result, it is possible to receive and collect sensor data without interruption. Further, since the relay terminal 10 with the highest reception strength is selected as the target relay terminal, sensor data of a packet received by the relay terminal 10 with the highest reliability is collected even from a wireless sensor S with low output power. Accordingly, it is possible to build the sensor system 1 with high reliability. This approach is effective especially in BLE (Bluetooth Low Energy) in which the maximum length of a packet size is short because variation in reception strength within one packet is small.

Relay Terminal Selection Operation

Figure 6:
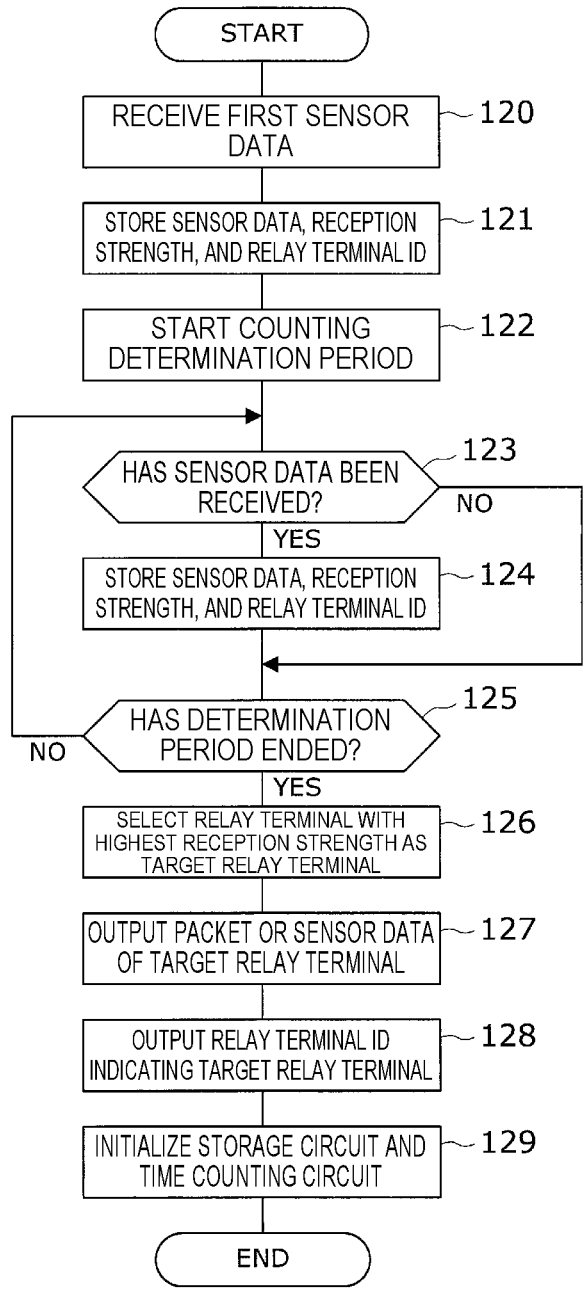
FIG. 6 is a flowchart showing a relay terminal selection operation in the control device.

Then, referring to FIG. 4 and FIG. 6, a relay terminal selection operation in the control device 20 of the sensor system 1 according to the wireless coordinated reception method of this embodiment will be described. FIG. 6 is a flowchart showing a relay terminal selection operation in the control device. Note that the flowchart showing the relay terminal selection operation shown in FIG. 6 is not limited to the following procedure, various modifications that may be understood by those skilled in the art can be made as appropriate.

In FIG. 6, it is assumed that, in the control device 20, the transmission source identification circuit 22 identifies the transmission source wireless sensor S from a received packet, and outputs the packet, its reception strength, and further a relay terminal ID indicating a relay terminal 10 that has received the packet to the relay terminal selection circuit 23 corresponding to the transmission source wireless sensor S. It is assumed that at the start of the relay terminal selection operation, the storage circuit 31 is initialized to a clear state in which all the stored packets are cleared and the time counting circuit 32 is stopped.

First, the relay terminal selection circuit 23 acquires the first packet, the reception strength, and the relay terminal ID that are output from the transmission source identification circuit 22 (step S120), and stores them in the storage circuit 31 (step S121). Further, the relay terminal selection circuit 23 starts counting the waiting period using the time counting circuit 32 in response to a trigger signal synchronized with the first packet that is output from the relay terminal selection circuit 23 (step S122). Note that the trigger signal may be configured to be generated by the relay terminal selection circuit 23 and input to the time counting circuit 32 in response to, for example, the first packet being stored in the storage circuit 31 from the clear state.

Then, the relay terminal selection circuit 23 confirms whether a new packet has been output from the transmission source identification circuit 22 (step S123), and when a new packet has been output (step S123: YES), it stores the new packet, the reception strength, and the relay terminal ID in the storage circuit 31 (step S124), and confirms whether the waiting time in the time counting circuit 32 has ended (step S125). Note that when a new packet has not been output in step S123 (step S123: NO), the relay terminal selection circuit 23 transitions to step S125.

When the waiting period has not ended yet in step S125 (step S125: NO), it returns to step S123. Thereby, after a packet transmitted from the same wireless sensor S is first received by any relay terminal 10, packets received by other relay terminals 10 within a certain waiting period are stored in the storage circuit 31. This waiting period is for covering a variation among the arrival times of packets at which they arrive at the control device 20 via each relay terminal 10, and set to be shorter than the sampling period of sensor data in the wireless sensors S.

When the waiting period has ended in step S125 (step S125: YES), the relay terminal selection circuit 23 uses the selection circuit 33 to select the relay terminal ID for the packet with the highest reception strength from among the packets stored in the storage circuit 31 as the target relay terminal (step S126).

Thereafter, the relay terminal selection circuit 23 uses the selection circuit 33 to output the packet of the target relay terminal or sensor data stored in the packet to the network I/F circuit 25 (step S127), outputs the relay terminal ID indicating the target relay terminal to the response instruction circuit 24 (step S128), initializes the storage circuit 31 to the clear state and presets the counter value of the time counting circuit 32 (step S129), thereby ending the series of relay terminal selection operations.

Effects of First Embodiment

Thus, this embodiment is configured such that the relay terminals 10 each transmit to the control device 20 a packet received from a wireless sensor S and a reception strength for short range wireless communication detected when receiving the packet, and return a response to the packet to a transmission source wireless sensor S from which the packet is transmitted only when a response instruction is issued from the control device 20, and the control device 20 compares reception strengths for the same packet that is transmitted from the same wireless sensor S and received by each of the plurality of relay terminals 10 among the reception strengths received from the relay terminals 10, transmits the response instruction only to one target relay terminal with the highest reception strength, and performs relay transfer of sensor data stored in a packet received by the target relay terminal to the host apparatus H.

Thereby, even when a packet transmitted from a wireless sensor S is received by a plurality of relay terminals 10, one response is returned to the wireless sensor S only from one target relay terminal. That is, even when a short range wireless communication scheme is used, coordinated reception of a packet transmitted from a wireless sensor S among the relay terminals 10 is realized. Accordingly, it is possible to avoid disconnection of wireless communication on the side of the wireless sensor S that may occur when a plurality of responses are returned to the wireless sensor S, and as a result, it is possible to receive and collect sensor data without interruption.

Further, since the relay terminal 10 with the highest reception strength is selected as the target relay terminal, sensor data of a packet received by the relay terminal 10 with the highest reliability is collected even from a wireless sensor S with low output power. Accordingly, it is possible to build the sensor system 1 with high reliability. This approach is effective especially in BLE (Bluetooth Low Energy) in which the maximum length of a packet size is short because variation in reception strength within one packet is small.

Further, in this embodiment, the relay terminals 10 may each be composed of: the reception antenna AR and the transmission antenna AT; the reception circuit 11 for short range wireless communication connected to the reception antenna AR; the transmission circuit 12 for short range wireless communication connected to the transmission antenna AT; the communication circuit 14 that performs data communication with the control device 20 through the communication line L; and the control circuit 13 that transmits the packet received by the reception circuit 11 and the reception strength for the packet detected by the reception circuit 11 from the communication circuit 14 to the control device 20, and returns the response from the transmission circuit 12 to the transmission source wireless sensor S only when the response instruction from the control device 20 is received by the communication circuit 14. Thereby, it is possible to reduce the cost of a relay terminal 10 because a host controller interface (HCI) generally required is not required.

Further, in this embodiment, the relay terminals 10X may each be composed of: the antenna AX for both transmission and reception; the isolator 15 connected to the antenna AX for both transmission and reception; the reception circuit 11 and the transmission circuit 12 for short range wireless communication that are connected to the antenna AX for both transmission and reception via the isolator 15; the communication circuit 14 that performs data communication with the control device 20 through the communication line L; and the control circuit 13 that transmits the packet received by the reception circuit 11 and the reception strength for the packet detected by the reception circuit 11 from the communication circuit 14 to the control device 20, and returns the response from the transmission circuit 12 to the transmission source wireless sensor S only when the response instruction from the control device 20 is received by the communication circuit 14. Since this enables the relay terminal 10X to be composed of one antenna, it is useful for cost reduction.

Further, in this embodiment, the control device 20 may be composed of: the communication circuit 21 that performs data communication with the plurality of relay terminals 10 through the communication line L; the transmission source identification circuit 22 that identifies the transmission source wireless sensor S for the packet based on the packet received by the communication circuit 21; the relay terminal selection circuit 23 that compares reception strengths for the same packet that is transmitted from the same wireless sensor S and received by each of the plurality of relay terminals 10 among the reception strengths received by the communication circuit 21, and selects a relay terminal 10 with the highest reception strength as the target relay terminal; the response instruction circuit 24 that generates a response instruction to the target relay terminal and transmits the response instruction from the communication circuit 21 to the target relay terminal; and the network interface circuit 25 that performs relay transfer of sensor data stored in the packet transmitted from the target relay terminal to the host apparatus H.

More specifically, a configuration is possible such that the control device 20 comprises the relay terminal selection circuit 23 in plurality, the transmission source identification circuit 22 outputs a plurality of packets that are transmitted from an identified transmission source wireless sensor S and received by the plurality of respective relay terminals 10 and a plurality of reception strengths for these plurality of respective packets to a relay terminal selection circuit 23 corresponding to the identified transmission source wireless sensor S of the relay terminal selection circuits 23, and the relay terminal selection circuit 23 stores the plurality of packets and the plurality of reception strengths output from the transmission source identification circuit 22, compares the plurality of reception strengths, and selects a relay terminal 10 with highest reception strength of the plurality of relay terminals 10 as the target relay terminal.

Further, in this embodiment, the relay terminal selection circuits 23 may each be composed of: the storage circuit 31 that stores the plurality of packets and the plurality of reception strengths output from the transmission source identification circuit 22; the time counting circuit 32 that counts a waiting period of a certain time length from a reception timing of a packet first received from the identified transmission source wireless sensor S; and the selection circuit 33 that in response to expiration of the waiting period, compares the plurality of reception strengths stored in the storage circuit 31 during the waiting period, and selects a relay terminal 10 with highest reception strength of the plurality of relay terminals 10 as the target relay terminal. Thereby, since a relay terminal selection circuit 23 can be implemented in the control device 20 in a very simple configuration, many relay terminal selection circuits 23 can be mounted on the control device 20. Since this means that a large number of wireless sensors S can be handled by the control device 20, it can be said that it is more suitable for IoT systems than general short range wireless systems in which the number of connections is limited depending on the IC chip used.

Further, in this embodiment, the transmission source identification circuit 22, the relay terminal selection circuits 23, and the response instruction circuit 24 of the control device 20 may be implemented by hardware using dedicated circuits. This gives superiority that can reduce delay and power consumption as compared to a case where the functions of these circuit units are implemented by software. In particular, in this sensor system 1, when returning a response to the transmission source wireless sensor S is delayed, there is a risk that the side of the wireless sensor S erroneously recognizes that the wireless connection has been disconnected to release the wireless connection with the relay terminal 10. Since a waiting time for this response is different for each wireless sensor S, it is extremely useful to configure hardware in order to expand wireless sensors S connectable to this sensor system 1.

At this time, the transmission source identification circuit 22, the relay terminal selection circuits 23, and the response instruction circuit 24 are preferably configured with an ASIC (application specific integrated circuit) or an FPGA (field programmable gate array). Reasons for this include that selective use is enabled such as using a low-price FPGA with a small circuit scale when the numbers of users and wireless sensors S of this sensor system 1 are small, and on the other hand, using a large scale FPGA to which many circuits can be added when the numbers of the users and the wireless sensors S are large. Although developing an ASIC can significantly reduce the cost by large scale production, the circuit scale is fixed at the time of development, so that selective use cannot be performed depending on the scale. Since a small start is often required especially in applications related to IoT, an FPGA that allows selective use depending on the scale is useful.

Second Embodiment

Figure 7:
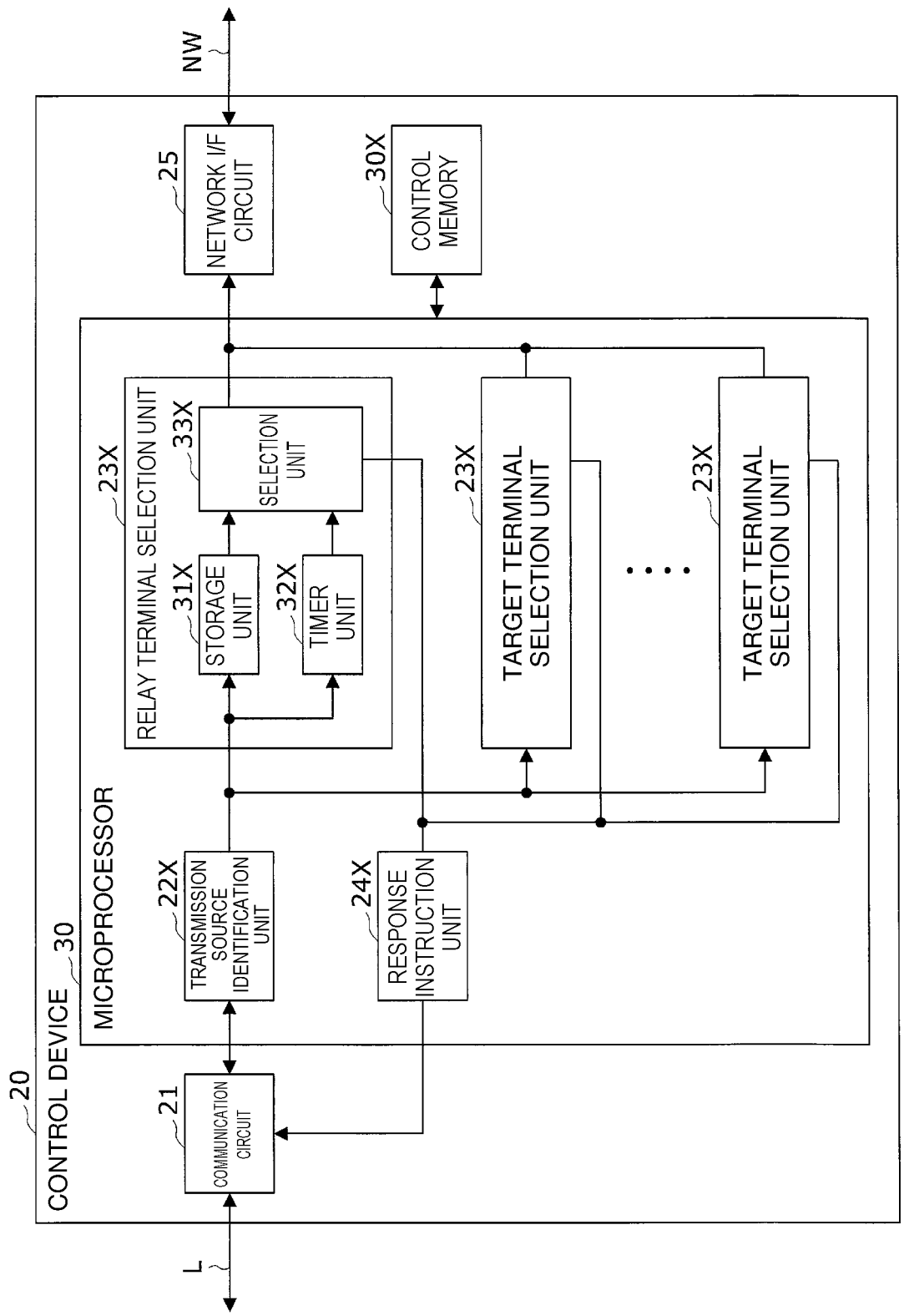
FIG. 7 is a block diagram showing a configuration of a control device according to a second embodiment.

Then, referring to FIG. 7, the control device 20 of the sensor system 1 according to a second embodiment of the present invention will be described. FIG. 7 is a block diagram showing a configuration of a control device according to the second embodiment. Although FIG. 4 described above has described a case by way of example where the transmission source identification circuit 22, the relay terminal selection circuits 23, and the response instruction circuit 24 of the control device 20 are each configured by hardware, that is, with a dedicated circuit unit, these may be configured with processing units using software.

FIG. 7 shows an example in which the control device 20 is composed of the communication circuit 21, the network I/F circuit 25, a microprocessor 30, and a control memory 30X. The microprocessor 30 cooperates with a program (software) stored in the control memory 30X or an internal memory (not shown) of the microprocessor 30 composed of a semiconductor memory to implement an arithmetic processing unit for executing a relay terminal control operation in the control device 20. This arithmetic processing unit constitutes a transmission source identification unit 22X, relay terminal selection units 23X, a response instruction unit 24X, a storage unit 31X, a time counting unit 32X, and a selection unit 33X.

These transmission source identification unit 22X, relay terminal selection units 23X, and response instruction unit 24X correspond to the transmission source identification circuit 22, the relay terminal selection circuits 23, and the response instruction circuit 24 in FIG. 4, respectively. Further, the storage unit 31X, the time counting unit 32X, and the selection unit 33X in a relay terminal selection unit 23X correspond to the storage circuit 31, the time counting circuit 32, and the selection circuit 33 in FIG. 4.

Effects of Second Embodiment

This can reduce the mounting area on a circuit board as compared to a case of configuration by hardware, and the effect increases as the number of users or wireless sensors S increases. Further, the power consumption of the entire control device 20 can be suppressed. Note that although FIG. 7 shows an example in which all of the transmission source identification circuit 22, the relay terminal selection circuits 23, and the response instruction circuit 24 are configured with the arithmetic processing unit, there is no limitation to this, and at least one of the transmission source identification circuit 22, the relay terminal selection circuits 23, and the response instruction circuit 24 may be configured with the arithmetic processing unit.

Third Embodiment

Figure 8:
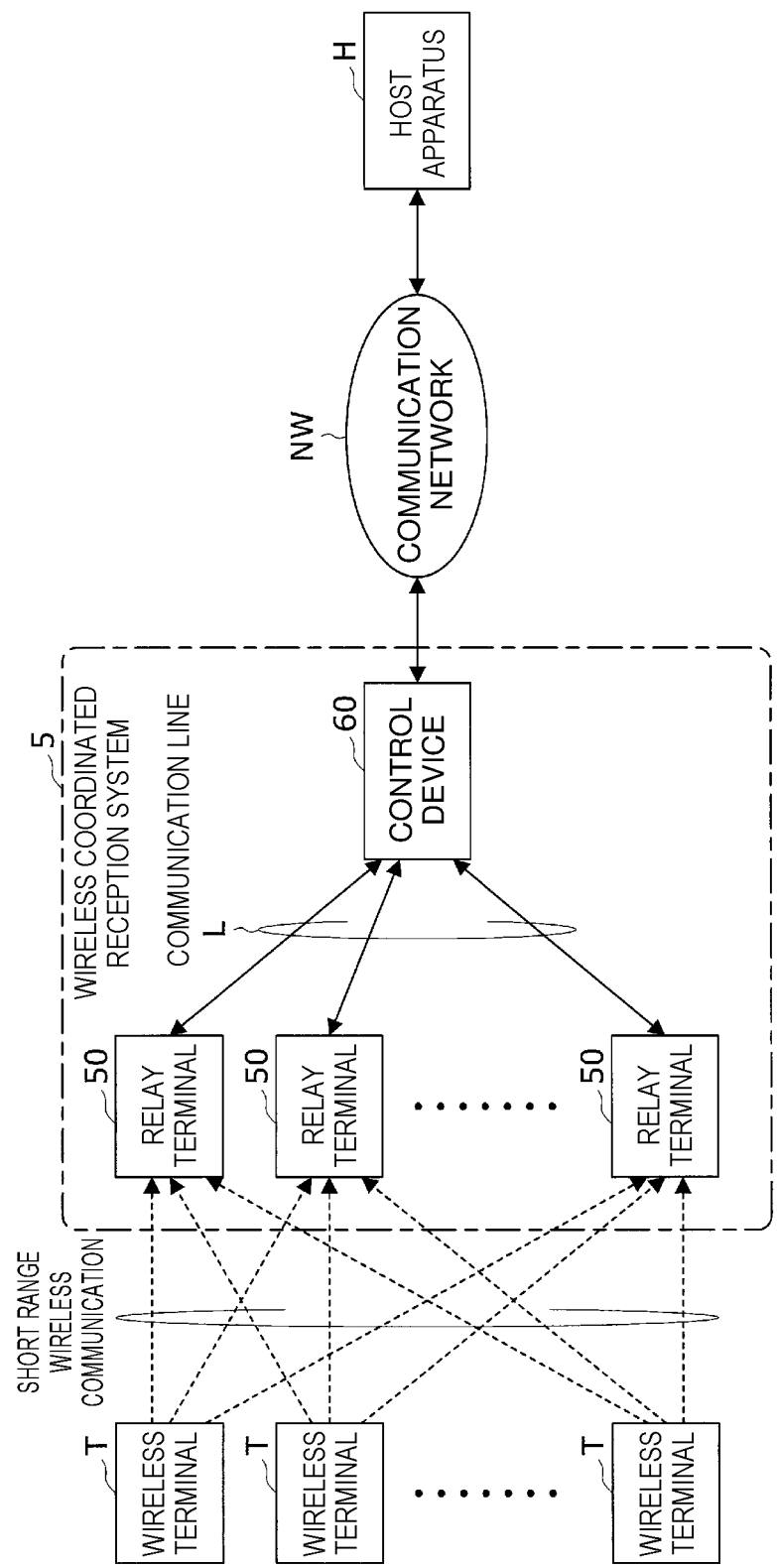
FIG. 8 is a block diagram showing a configuration of a wireless coordinated reception system according to a third embodiment.
Figure 9:
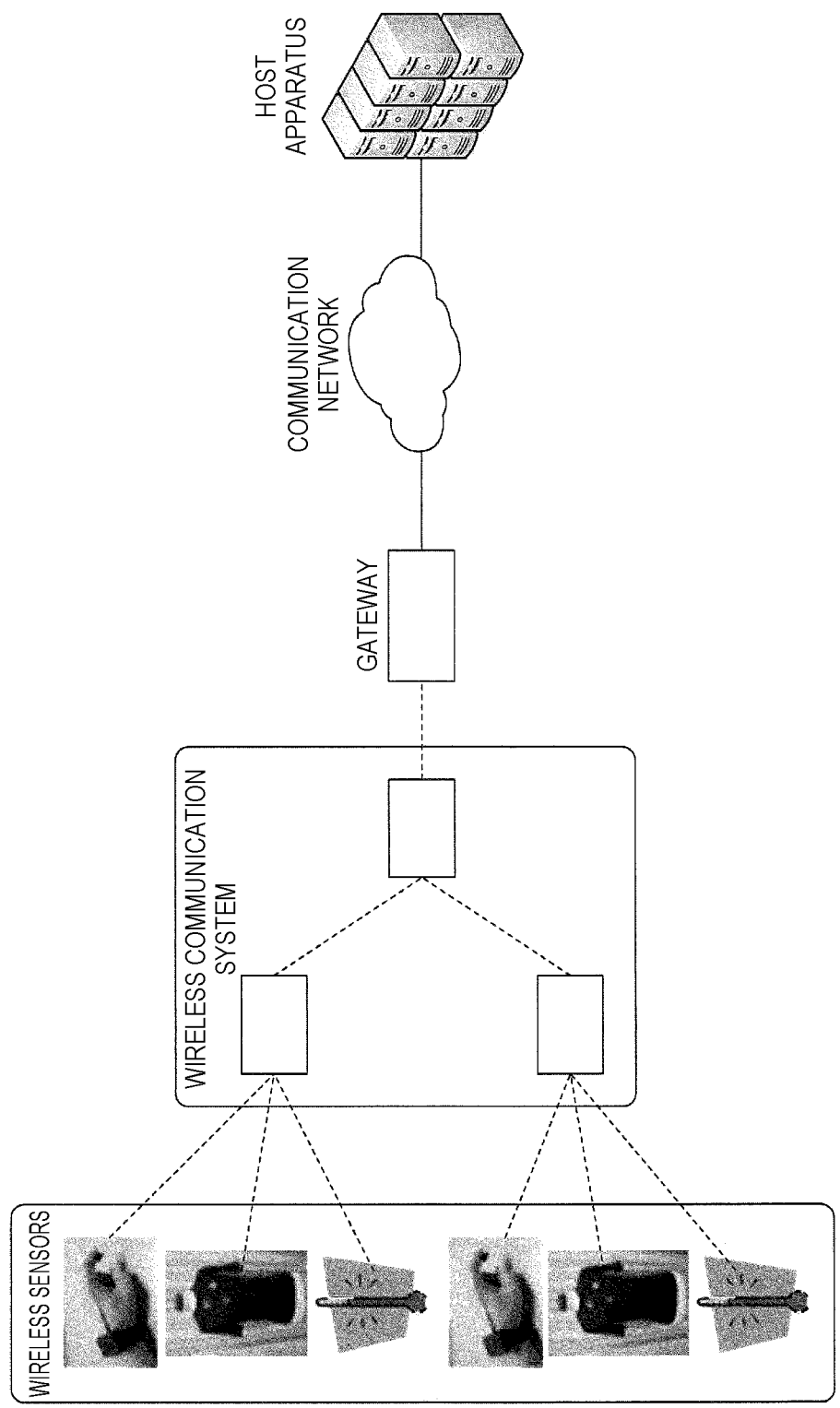
FIG. 9 is a configuration diagram showing a general sensor system.

Then, referring to FIG. 8, a wireless coordinated reception system 5 according to a third embodiment of the present invention will be described. FIG. 8 is a block diagram showing a configuration of a wireless coordinated reception system according to the third embodiment.

Although FIG. 1 described above has described an application by way of example in which the wireless coordinated reception system 2 is applied to the sensor system 1 and packets storing sensor data are received from a plurality of wireless sensors S, there is no limitation to this. The wireless coordinated reception system 5 according to this embodiment can also be applied to general applications in which packets storing data other than sensor data are received from wireless terminals T, as shown in FIG. 8.

The wireless coordinated reception system 5 is composed of: a plurality of relay terminals 50 that perform short range wireless communication with a plurality of wireless terminals T; and one control device 60 that controls reception operation of packets in these relay terminals 50. The configuration and operation of these relay terminals 50 and the control device 60 are the same as those of the relay terminals 10 and the control device 20 in FIG. 1 described above.

The relay terminals 50 each transmit to the control device 60 a packet received from a wireless terminal T and a reception strength for short range wireless communication detected when receiving the packet, and return a response to the packet to a transmission source wireless terminal T from which the packet is transmitted only when a response instruction is issued from the control device 60. The control device 60 compares reception strengths for the same packet that is transmitted from the same wireless terminal T and received by each of the plurality of relay terminals 50 among the reception strengths received from the relay terminals 50. The control device 60 transmits the response instruction only to one target relay terminal with the highest reception strength, and performs relay transfer of data stored in the packet received by the target relay terminal to the host apparatus H.

Effects of Third Embodiment

Thereby, even when a packet transmitted from a wireless terminal T is received by a plurality of relay terminals 50, one response is returned to the wireless terminal T only from one target relay terminal. That is, even when a short range wireless communication scheme is used, coordinated reception of a packet transmitted from a wireless terminal T among the relay terminals 50 is realized. Accordingly, it is possible to avoid disconnection of wireless communication on the side of the wireless terminal T that may occur when a plurality of responses are returned to the wireless terminal T, and as a result, it is possible to receive and collect sensor data without interruption.

Further, since the relay terminal 50 with the highest reception strength is selected as the target relay terminal, sensor data of a packet received by the relay terminal 50 with the highest reliability can be collected even from a wireless terminal T with low output power. Accordingly, it is possible to build a wireless system with high reliability.

Extension of Embodiments

Although the present invention has been described above with reference to embodiments, the present invention is not limited to the above embodiments. Various modifications that may be understood by those skilled in the art within the scope of the present invention can be made to the configurations and details of the present invention. Further, each embodiment can be implemented in any combination within a consistent range.

REFERENCE SIGNS LIST

1 Sensor system
2, 5 Wireless coordinated reception system
10, 50 Relay terminal
11 Reception circuit
12 Transmission circuit
13 Control circuit
14 Communication circuit
15 Isolator
16 Storage circuit
20, 60 Control device
21 Communication circuit
22 Transmission source identification circuit
22X Transmission source identification unit
23 Relay terminal selection circuit
23X Relay terminal selection unit
24 Response instruction circuit
24X Response instruction unit
25 Network I/F circuit (network interface circuit)
30 Microprocessor
30X Control memory
31 Storage circuit
31X Storage unit
32 Time counting circuit
32X Time counting unit
33 Selection circuit
33X Selection unit
S Wireless sensor
T Wireless terminal
AR Reception antenna
AT Transmission antenna
AX Antenna for both transmission and reception
L Communication line
NW Communication network
H Host apparatus.

The invention claimed is:

1. A sensor system comprising:
a wireless sensor configured to store detected sensor data in a packet and transmit the packet by short range wireless communication;
a plurality of relay terminals each configured to receive the packet from the wireless sensor; and
a control device connected to the plurality of relay terminals through a communication line, the control device being configured to control a reception operation of the packet in each of the plurality of relay terminals,
wherein each of the plurality of relay terminals is configured to:
transmit, to the control device, the packet received from the wireless sensor and a corresponding reception strength for a corresponding short range wireless communication detected when receiving the packet; and
return a response to the packet to the wireless sensor only when a response instruction is issued from the control device; and
wherein the control device is configured to compare a corresponding reception strength for the packet received from each of the plurality of relay terminals, transmit the response instruction only to a target relay terminal of the plurality of relay terminals with a highest reception strength, and perform relay transfer of sensor data stored in the packet received by the target relay terminal to a host apparatus.

2. The sensor system according to claim 1, wherein the plurality of relay terminals each comprise:
a reception antenna and a transmission antenna;
a reception circuit for the short range wireless communication and connected to the reception antenna;
a transmission circuit for the short range wireless communication and connected to the transmission antenna;
a communication circuit configured to perform data communication with the control device through the communication line; and
a control circuit configured to transmits the packet received by the reception circuit and the corresponding reception strength for the packet detected by the reception circuit from the communication circuit to the control device, and return the response from the transmission circuit to the wireless sensor only when the response instruction from the control device is received by the communication circuit.

3. The sensor system according to claim 1, wherein the relay terminals each comprise:
an antenna for both transmission and reception;
an isolator connected to the antenna for both transmission and reception;
a reception circuit and a transmission circuit for the short range wireless communication that are connected to the antenna for both transmission and reception via the isolator;
a communication circuit configured to perform data communication with the control device through the communication line; and
a control circuit configured to transmits the packet received by the reception circuit and the corresponding reception strength for the packet detected by the reception circuit from the communication circuit to the control device, and return the response from the transmission circuit to the wireless sensor only when the response instruction from the control device is received by the communication circuit.

4. The sensor system according to claim 1, wherein the control device comprises:
  a communication circuit configured to perform data communication with the plurality of relay terminals through the communication line;
  a transmission source identification circuit configured to identifies the wireless sensor based on the packet received by the communication circuit;
  a relay terminal selection circuit configured to compare a corresponding reception strength for the packet received from each of the plurality of relay terminals and select a relay terminal with the highest reception strength as the target relay terminal;
  a response instruction circuit configured to generate a response instruction to the target relay terminal, and transmit the response instruction from the communication circuit to the target relay terminal; and
  a network interface circuit configured to perform relay transfer of the detected sensor data stored in the packet transmitted from the target relay terminal to the host apparatus.

5. The sensor system according to claim 4, wherein:
  the control device comprises the relay terminal selection circuit in plurality;
  the transmission source identification circuit is configured to output a plurality of packets that are transmitted from the wireless sensor and received by the plurality of relay terminals and a plurality of reception strengths for these plurality of packets to a relay terminal selection circuit corresponding to the wireless sensor of the relay terminal selection circuits; and
  the relay terminal selection circuit is configured to store the plurality of packets and the plurality of reception strengths, compare the plurality of reception strengths, and select a relay terminal with the highest reception strength of the plurality of relay terminals as the target relay terminal.

6. The sensor system according to claim 5, wherein each of the relay terminal selection circuits comprises:
  a storage circuit configured to store the plurality of packets and the plurality of reception strengths output from the transmission source identification circuit;
  a time counting circuit configured to count a waiting period of a certain time length from a reception timing of a packet first received from the wireless sensor; and
  a selection circuit configured to in response to an expiration of the waiting period, compare the plurality of reception strengths stored in the storage circuit during the waiting period, and select a relay terminal with the highest reception strength of the plurality of relay terminals as the target relay terminal.

7. The sensor system according to claim 4, wherein the control device comprises a microprocessor and a control memory, wherein the transmission source identification circuit, the relay terminal selection circuits, and the response instruction circuit are configured by the microprocessor cooperating with a program stored in the control memory.

8. A wireless coordinated reception system comprising:
  a plurality of relay terminals that each receive a packet transmitted from a wireless terminal by short range wireless communication; and
  a control device that is connected to the plurality of relay terminals through a communication line, and configured to control reception operation of the packet in the plurality of relay terminals,
  wherein the plurality of relay terminals each is configured to:
    detect a reception strength for the short range wireless communication when receiving the packet;
    transmit the reception strength to the control device; and
    return a response to the packet to the wireless terminal only when a response instruction is issued from the control device; and
  wherein the control device is configured to compare a corresponding reception strength for the packet received from each of the plurality of relay terminals, and transmit the response instruction only to a target relay terminal of the plurality of relay terminals with a highest reception strength, and perform relay transfer of sensor data stored in the packet received by the target relay terminal to a host apparatus.

9. A wireless coordinated reception method used in a wireless coordinated reception system comprising a plurality of relay terminals and a control device connected to the plurality of relay terminals through a communication line, the wireless coordinated reception method comprising:
  a reception step of the plurality of relay terminals each receiving a packet transmitted from a wireless terminal by short range wireless communication; and
  a control step of the control device controlling reception operation of the packet in the plurality of relay terminals,
  wherein the reception step includes:
    a step of detecting a reception strength for the short range wireless communication when receiving of the packet and transmitting the reception strength to the control device; and
    a step of returning a response to the packet to the wireless terminal only when a response instruction is issued from the control device, and
  the control step includes a step of comparing a corresponding reception strength for the packet received from each of the plurality of relay terminals, and transmitting the response instruction only to a target relay terminal of the plurality of relay terminals with a highest reception strength.

* * * * *